United States Patent
Borshukov et al.

(10) Patent No.: US 7,536,047 B2
(45) Date of Patent: May 19, 2009

(54) METHOD FOR DIGITALLY RENDERING SKIN OR LIKE MATERIALS

(75) Inventors: George Borshukov, San Francisco, CA (US); John P. Lewis, Wellington (NZ)

(73) Assignee: Warner Bros. Entertainment Inc., Burbank, CA (US)

( * ) Notice: Subject to any disclaimer, the term of this patent is extended or adjusted under 35 U.S.C. 154(b) by 728 days.

(21) Appl. No.: 10/715,777

(22) Filed: Nov. 17, 2003

(65) Prior Publication Data

US 2004/0150642 A1  Aug. 5, 2004

Related U.S. Application Data

(60) Provisional application No. 60/426,560, filed on Nov. 15, 2002.

(51) Int. Cl.
*G06K 9/00* (2006.01)
(52) U.S. Cl. ..................................................... 382/154
(58) Field of Classification Search .................. None
See application file for complete search history.

(56) References Cited

U.S. PATENT DOCUMENTS

| | | | |
|---|---|---|---|
| 5,051,902 A | 9/1991 | Hishinuma | |
| 5,490,240 A | 2/1996 | Foran et al. | |
| 5,499,306 A | 3/1996 | Sasaki et al. | |
| 5,546,475 A * | 8/1996 | Bolle et al. | 382/190 |
| 5,739,820 A * | 4/1998 | Lyon | 345/426 |
| 5,748,792 A * | 5/1998 | Wober | 382/250 |
| 5,966,134 A * | 10/1999 | Arias | 345/589 |
| 6,034,690 A | 3/2000 | Gallery et al. | |
| 6,078,332 A | 6/2000 | Ohazama | |
| 6,272,231 B1 * | 8/2001 | Maurer et al. | 382/103 |
| 6,297,834 B1 | 10/2001 | Malzbender | |
| 6,330,000 B1 | 12/2001 | Fenney et al. | |
| 6,373,496 B1 | 4/2002 | Iourcha | |

(Continued)

FOREIGN PATENT DOCUMENTS

JP  1-106275  4/1989

(Continued)

OTHER PUBLICATIONS

"A Rapid Hierarchical Rendering Technique for Translucent Materials" by Henrik Wann Jensen (Stanford University) and Juan Buhler (PDI/Dream Works), ACM SIGGRAPH 2002.

(Continued)

*Primary Examiner*—Matthew C Bella
*Assistant Examiner*—Alex Liew
(74) *Attorney, Agent, or Firm*—Connolly Bove Lodge & Hutz LLP; Jonathan A. Jaech

(57) ABSTRACT

A computationally efficient method for rendering skin tissue to achieve lifelike results includes application of a blurring algorithm to a two-dimensional light map. The algorithm is compact and is not derived from complex mathematical models of subsurface scattering in translucent materials, and yet achieves results similar to more complex models. The method includes receiving three-dimensional surface geometry relating to a digital object and other information for defining modeled light reflected from the surface, generating a two-dimensional matrix of light intensity values mapped to the surface geometry, blurring the matrix using a compact algorithm, and rendering the object using the blurred light intensity values.

20 Claims, 7 Drawing Sheets

U.S. PATENT DOCUMENTS

| | | | |
|---|---|---|---|
| 6,400,848 B1* | 6/2002 | Gallagher | 382/254 |
| 6,496,597 B1 | 12/2002 | Tampieri | |
| 6,504,538 B1 | 1/2003 | Freund et al. | |
| 6,515,674 B1 | 2/2003 | Gelb et al. | |
| 6,571,024 B1 | 5/2003 | Sawhney et al. | |
| 6,690,815 B2* | 2/2004 | Mihara et al. | 382/118 |
| 6,765,573 B2 | 7/2004 | Kouadio | |
| 2002/0009224 A1* | 1/2002 | Gatti et al. | 382/154 |
| 2003/0123713 A1* | 7/2003 | Geng | 382/118 |

FOREIGN PATENT DOCUMENTS

| | | |
|---|---|---|
| JP | 8-255264 | 10/1996 |
| JP | 11-513162 | 11/1999 |
| JP | 2002-183753 | 6/2002 |
| JP | 2002-208031 | 7/2002 |

OTHER PUBLICATIONS

A Practical Model for Subsurface Light Transport by Henrik Wann Jensen; Stephen R. Marschner, Marc Levoy and Pat Hanrahan, SIGGRAPH 2001.

"Teaching Texture Mapping Visually" by Rosalee Wolfe, DePaul University; wolfe@csdepaul.edu.

"Preserving Attribute Values on Simplified Meshes by Resampling Detail Textures" by P.Cignoni, C. Montani, C. Rocchini, R. Scopigno, M. Tarini, The Visual Computer (1999); 15:519-539; Springer-Verlag 1999.

"Convolution", Glossary Term; http://www.cee.hw.ac.uk/hipr/html/convolve.html.

Gaussian Smoothing, Spatial Filters—Gaussian Smoothing; pp. 1-7; http://www.cee.hw.ac.uk/hipr/html/gsmooth.html.

"Fourier Transform", Image Transform—Fourier Transform; pp. 1-7; http://www.cee.hw.ac.uk/hipr/htm/fourier.html.

English Translation of Office Action Dated Jun. 11, 2008 For App. No. 2004-553826, Warner Bros. Entertainment, Inc.

"Real Abilities of Low-Priced CG Software", Super Guidebook for 3DCG Creators, 1st Edition/CG & Digital Video World Special, Japan, Works Corporation, Inc., May 1, 1999, p. 116 to 119.

Yasuhiko Watanabe, et al., "Synchronized Acquisition of Cylindrical Range and Color Date", NTT R & D Telecommunications Association, Apr. 10, 1993, 42nd vol. 4th Issue, p. 465 to 476.

* cited by examiner

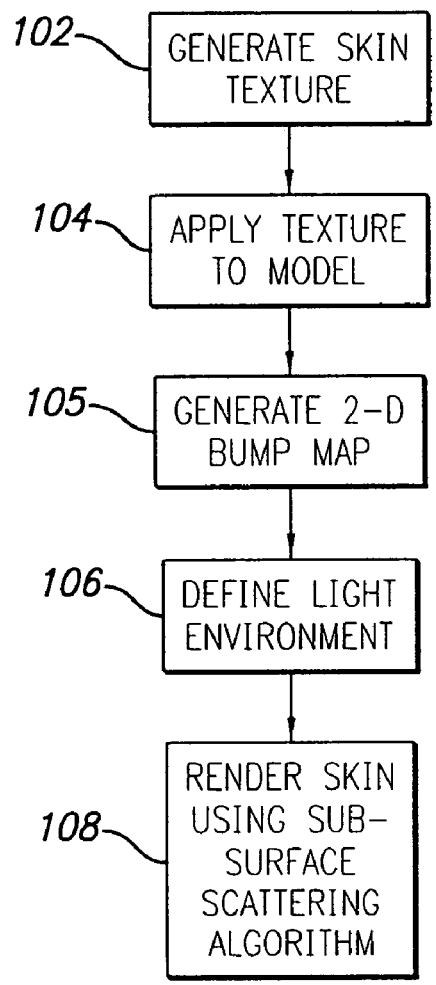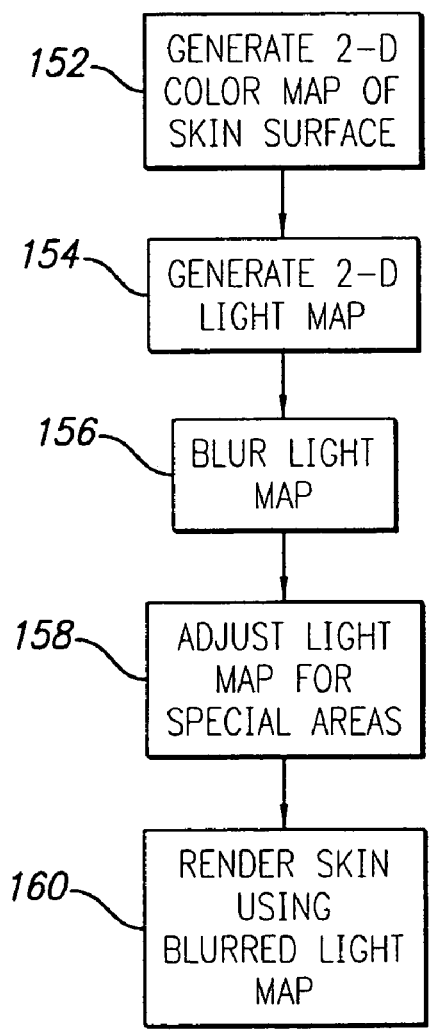

METHOD FOR DIGITALLY RENDERING SKIN OR LIKE MATERIALS

CROSS-REFERENCE TO RELATED APPLICATION

This application claims priority pursuant to 35 U.S.C. § 119(e) to U.S. Provisional Application No. 60/426,560, filed Nov. 15, 2002, which application is specifically incorporated herein, in its entirety, by reference.

COPYRIGHT NOTICE

This patent document contains material subject to copyright protection. The copyright owner, Time Warner Entertainment Company LP, has no objection to the reproduction of this patent document as it appears in the files of the Patent and Trademark Office of the United States or any other country, but otherwise reserves all rights whatsoever.

BACKGROUND OF THE INVENTION

1. Field of the Invention

The present invention relates to methods in the field of digital imaging, and more particularly, to methods for digital rendering of skin tissue or like materials to provide a more natural or lifelike appearance.

2. Description of Related Art

In recent decades, computers have increasingly been used to generate and/or modify moving images for virtually every application that makes use of them, for example, television and motion pictures, computer games, and engineering model building. As the processing power of computers has become increasingly affordable, more attention has been given to digitally representing all manner of scenes in a realistic, lifelike manner. The benefits of realistic digital representations should be readily apparent for entertainment and like applications, such as motion pictures and computer games. Realistic digital representation may also be quite useful in a number of non-entertainment applications, such as for training, cartography, medical imaging, or for any application that uses physical modeling. In general, realistic digital representations may be beneficial for any application in which it is desirable to simulate the appearance of actual physical objects, both moving and static, using a model that can be digitally manipulated. It is believed that use of digital modeling will become much more widespread in the future.

Numerous unsolved problems are recognized in field of realistic digital imaging. Many problems are associated with the digital representation of humans (or other animal forms, real or imaginary) in a realistic, lifelike manner. It is desirable in such cases that the use of the digital representation be undetectable by an attentive audience. Audiences are extremely perceptive of and sensitive to qualities associated with the human form, and especially of the human face and other skin areas under diverse lighting conditions. For many applications, therefore, it is desirable to realistically represent exposed areas of skin, and especially the face.

However, realistic rendering of skin tissue has been difficult to achieve due to the lack of efficient algorithms. Rendering algorithms are either excessively complex and time-consuming, or result in a waxy, plastic or lifeless result. Presently, painstaking effort by visual effects artists skilled in digital rendering may be required to realistically represent scenes involving faces or other exposed skin areas.

Automatic approaches to rendering may lessen the need for visual effects artists by automatically calculating color and intensity values, using an algorithm. In general, the interaction of skin tissue with light can be quite complex, making lifelike rendering of skin difficult, or at least, resource-intensive. It is known that the difficulty in rendering skin arises in part from the translucent nature of skin tissue, and subsurface scattering and transmission that occurs naturally in skin tissue. While mathematical models for accurately rendering translucent materials such as skin tissue do exist, these models are computationally complex. For example, methods employing the bi-directional reflectance distribution function (BRDF), the bi-directional surface scattering distribution function (BSSRDF) or Monte Carlo ray tracing are all computationally intensive. Computational requirements, therefore, make these prior art methods undesirable or unsuitable for rendering applications that require a relatively high volume and/or rate of rendering, such as motion picture, television, and other video production, and real-time applications such as video games. In view of the long-recognized complexity arising from the interaction of light with skin tissue, an efficient, compact algorithm for achieving lifelike rendering of skin would be both useful, and surprising.

SUMMARY OF THE INVENTION

The present invention provides methods for digital rendering of human skin, that overcomes the limitations of the prior art. A digital rendering of human skin is produced according to an improved method, to produce a lifelike appearance that includes subsurface scattering effects. Surprisingly, a realistic result is achieved without an algorithm that is based on a mathematical model for subsurface scattering. The method may be particularly effective when building a representation of a human face, and may also be used for other parts of the body, for animals, or perhaps selected other translucent materials. It may be combined with other methods for modeling human facial expressions, such as the motion-capture method for capturing facial expressions described in U.S. patent application Ser. No. 10/210,537, titled "Method and Apparatus For Digitally Rendering the Appearance and Motion of a Three-Dimensional Object in Space," to create realistic digital moving images of human faces.

To provide a more realistic skin appearance, subsurface scattering of light in the skin may be simulated using a novel method. The novel method includes the use of a compact algorithm that simulates the scattering effect of partially translucent human skin on ambient light, without making use of prior-art mathematical models for subsurface scattering. The algorithm is exceptionally compact and is not derived from mathematical models for scattering of light in translucent materials, and yet is surprisingly capable of achieving results that closely approximate results from more sophisticated (and more computationally intensive) methods, at least for skin tissue. The method may be applied to any skin, not just facial skin, to simulate the appearance of living skin tissue.

The novel method for rendering skin tissue to achieve lifelike results includes application of the blurring algorithm to a two-dimensional light map. The method includes receiving three-dimensional surface geometry relating to a digital object and other information for defining modeled light reflected from the surface, generating a two-dimensional matrix of light intensity values mapped to the surface geometry, blurring the matrix using the blurring algorithm, and rendering the object using the blurred light intensity values.

In a separate aspect of the invention, a detailed, three-dimensional skin texture of a critical area, such as a face, is accurately recorded for use in rendering. To record the skin texture, a cast (such as a plaster cast) may be made of a subject's face or other skin area. The cast may be made so that the fine details of the subject's skin, such as pores, wrinkles, scars, etc., are faithfully reproduced. The cast may then be digitally scanned using a laser scanner or other suitable device, and a digital model of the skin created from the scanner output data. The digital skin model generally includes the fine level of detail visible on the scanned cast. Then, the digital skin model may applied as a texture to a digital model of the subject's head or other body part from which the cast was made.

Use of a measured three-dimensional skin texture may enhance the results achieved by the method for simulating subsurface scattering, but is not required. Any desired method may be used to define skin texture, including the use of composite skin texture from different sources, artistically created skin texture, or skin texture created by a texture-generating algorithm.

A more complete understanding of the methods according to the present invention will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a flow chart showing exemplary steps for capturing and rendering skin tissue according to an embodiment of the invention.

FIG. 5 is a flow chart showing exemplary steps for calculating skin reflectance that mimics the effect of subsurface scattering.

DETAILED DESCRIPTION OF THE PREFERRED EMBODIMENTS

In an aspect of the invention, the limitations of the prior art are overcome by a method 100, exemplary steps of which are shown in FIG. 1.

Figure 2:
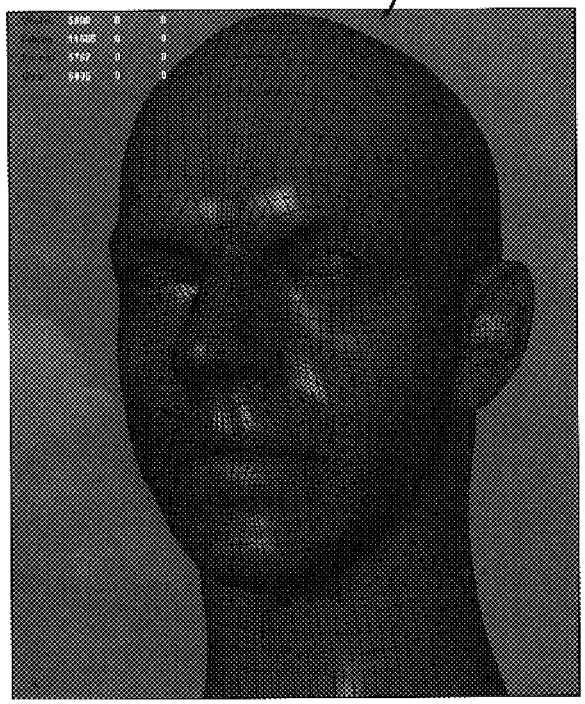
FIG. 2 shows an exemplary 3-D model of a human head suitable for use with the method of the invention.

As known in the art, a 3-D model of the subject to be rendered is created in any suitable manner. FIG. 2 shows an exemplary 3-D model 302 of a human head. It is an object of the present invention to render digital objects, in particular those digital objects that represent living things, to produce a more lifelike or natural appearance. While the invention may be particularly useful for rendering human faces and heads, it is anticipated that it may also be useful for rendering other natural objects with comparable subsurface light scattering properties.

Figure 3:
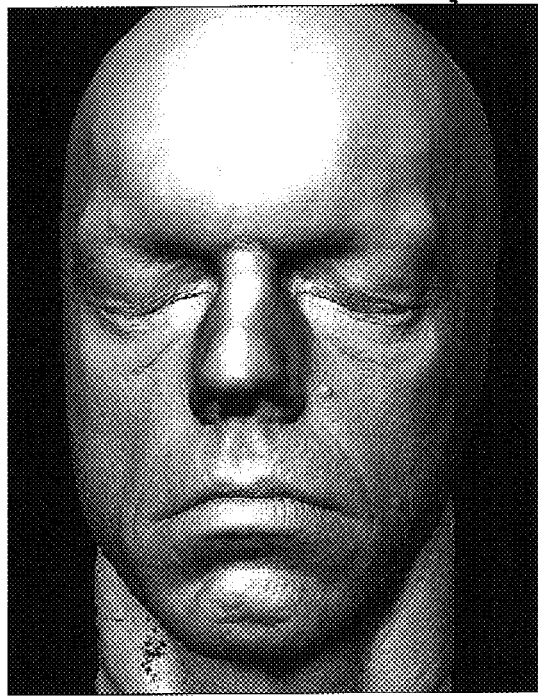
FIG. 3 shows an exemplary rendering of skin texture data from a high-resolution laser scan of a human head.

Referring again to FIG. 1, at step 102, a realistic skin texture is generated. This may be done by transferring a rubber mold of a human subject's exposed skin areas to a plaster cast. The plaster cast may then be laser scanned at high resolution to create a 3-D texture of fine skin features, including pores, wrinkles, and the like. FIG. 3 shows a view of exemplary skin texture data 304 such as may be collected from a human subject using a casting and scanning technique, as described above. Any other suitable method for capturing or creating skin texture data may be used.

At step 104, the fine skin texture is mapped to the 3-D model to be rendered, to create a skin texture model. For example, facial skin texture may be applied to a human head. Often, this mapping will require the effort of a graphic artist, because the correspondence between the digital skin data and the 3-D model will seldom be exact. For example, a comparison between the heads shown in FIGS. 2 and 3 shows that the two head shapes are generally similar, but differ with respect to some details. The skin data 304 shown in FIG. 3 will not fit perfectly over the 3-D model 302 shown in FIG. 2, without some adjustments. A graphic artist may make or oversee such adjustments, as known in the art. In other circumstances, a graphic artist may create skin texture directly on the 3-D model, without using texture data from a like object. For example, an artist may apply different skin textures from different data sources to create a composite skin texture model, may manually create skin texture, may generate texture using a suitable algorithm, or may employ some combination of the foregoing methods. Covered areas of skin, such as areas covered by hair or clothing, may not need to be supplied with skin texture.

After the skin texture data is mapped to the surface of a 3-D object, the skin texture model may be used to generate a 2-D bump map at step 105. A bump map, as known in the art, is a map of surface texture data from a 3-D object over a defined 2-D area. Bump mapping is a known technique for preserving detail in a rendered 3-D object while permitting a smaller or simplified 3-D mesh. Essentially, bump mapping involves computing a displacement and/or a difference in surface normal between a detailed 3-D surface topography—such as skin texture—and an associated mesh of a 3-D model. While bump mapping is believed desirable for most present-day applications, it should not be considered an essential or necessary step for achieving a lifelike result according to the invention. For example, instead of bump mapping, fine skin detail may be modeled as part of the 3-D object itself, or may be generated using an automatic algorithm of some type, or in any other suitable way.

Figure 4:
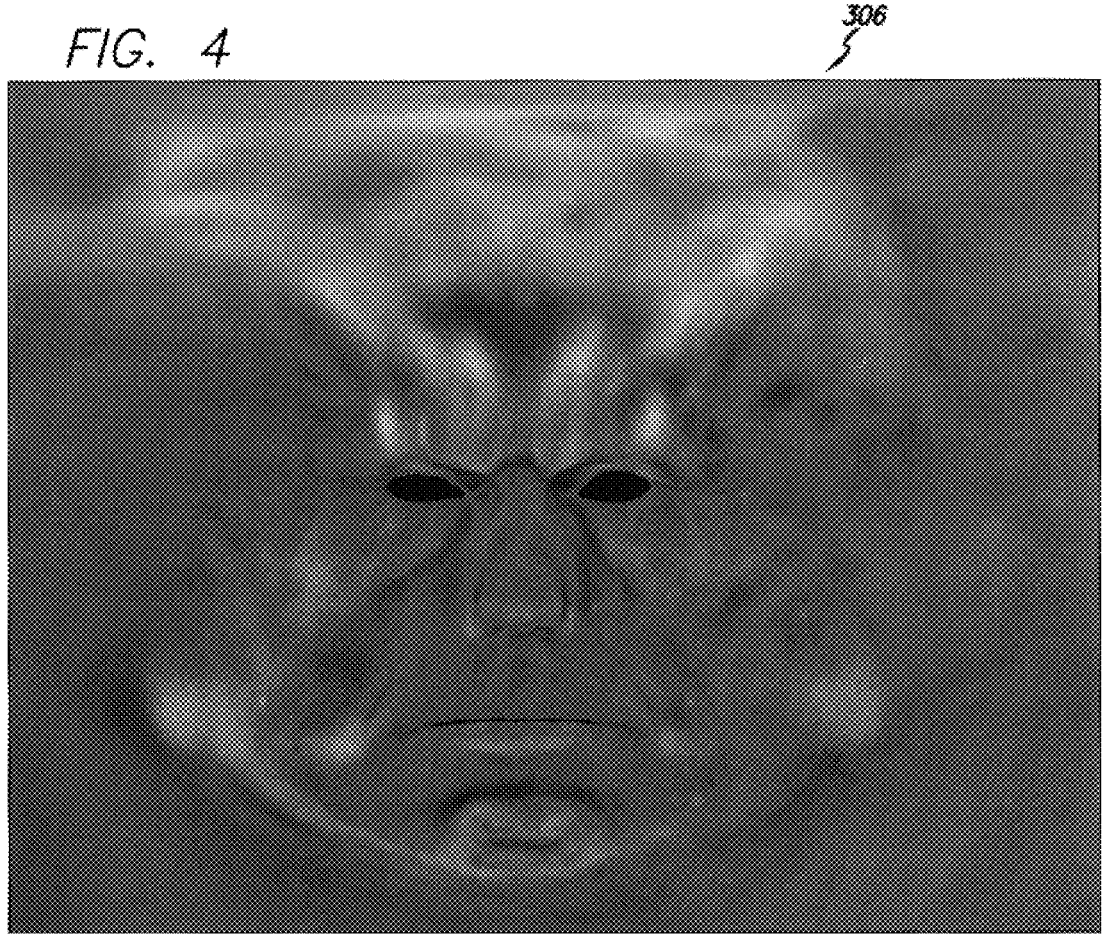
FIG. 4 is a black-and-white photograph showing an exemplary bump map generated using the skin texture data shown in FIG. 3.

The displacement value and/or surface-normal value for each matrix entry (i.e., "texel") of the bump map may be mapped to a corresponding 2-D surface in any desired manner. Various different methods may be used to compute a bump map, as known in the art. A gray scale print of an exemplary bump map 306 is shown in FIG. 4, generated from the skin texture data 304 shown in FIG. 3 and the model 302 shown in FIG. 3. The shading corresponds to the displacement of the skin texture relative to the mesh of the 3-D model. Lighter colors indicate relatively "high" features and darker colors (with the exception of the eye surfaces, which are excluded) indicate relatively "low" features. Greater topographical detail is present in the facial area.

Referring again to FIG. 1, at step 106, the light environment that will be used for rendering is defined. Any suitable method may be used, including defining light sources as done in conventional rendering, or using an image-based lighting system. At step 108, the skin is rendered using a novel algorithm and method that simulates the effect of subsurface scattering to achieve a realistic result, without performing a complex three-dimensional computation. The rendering method 150 applied in step 108 is itself a multi-step process, as diagrammed in FIG. 5 and described below. The end result is rendered skin that appears realistic and alive, in any light environment. To produce moving images, method 150 may be repeated for each frame of the moving image. In the alternative, method 150 may be performed for selected key frames, with intervening frames interpolated as known in the art.

Exemplary steps of a method 150 for mimicking the effect of subsurface scattering, which may be especially useful for rendering human skin but which may also be used for other materials, are shown in FIG. 5. The computations involved are much simpler than required by prior art methods for calculating or simulating subsurface scattering and transmission. In an initial step 152, a two-dimensional surface color map is created of the object to be rendered, such as a human head. Various techniques are known in the art for creating two-dimensional surface color maps, sometimes referred to as "texture maps." Bump maps are sometimes called texture maps, but as used herein, a texture map refers only to a color map as further described below. The term "texel" is used herein to refer to elements of either color maps or bump maps.

In brief, a two-dimensional color map comprises a two-dimensional matrix of color values taken from the surface of a three-dimensional object, with a defined one-to-one correspondence between each matrix element and elements of the three-dimensional surface. For example, surface colors from a human head may be "spread out" over a two-dimensional rectangular surface. Various different methods are used in the art to establish a correspondence—i.e., "map"—each point on the surface of the three-dimensional object to the two-dimensional map. Any suitable mapping method as known in the art may be used. A summary of various different texture mapping techniques may be found in the article *Teaching Texture Mapping Visually* by Rosalee Wolfe, published in the November, 1997 issue of Computer Graphics. U.S. patent application Ser. No. 10/210,537, which is incorporated herein by reference, discloses use of color maps—therein called a "flat feature topography"—in digital rendering of human faces.

Such color maps or flat feature topographies are often used in rendering three-dimensional objects, to simplify processing of digital objects by facilitating processing or use of mapped information in two-dimensional form. A color map may be generated as a pre-processing tool for later use in rendering. For example, a two-dimensional color map may be used to assign color values for the computation of reflected light during ray tracing. In ray tracing, light rays are traced between the desired viewpoint and the light environment, however it is defined. Color values may be assigned to each reflected light ray as a function of the point where the ray impinges on the viewed object, which in turn, corresponds to one or more texels of the color map. In the alternative, a light map may be used in combination with a color map to assign color and intensity values to pixels of the rendered object. Either way, the same color map may be used for different frames as the 3-D digital object and/or the viewpoint moves around the set.

Figure 6:
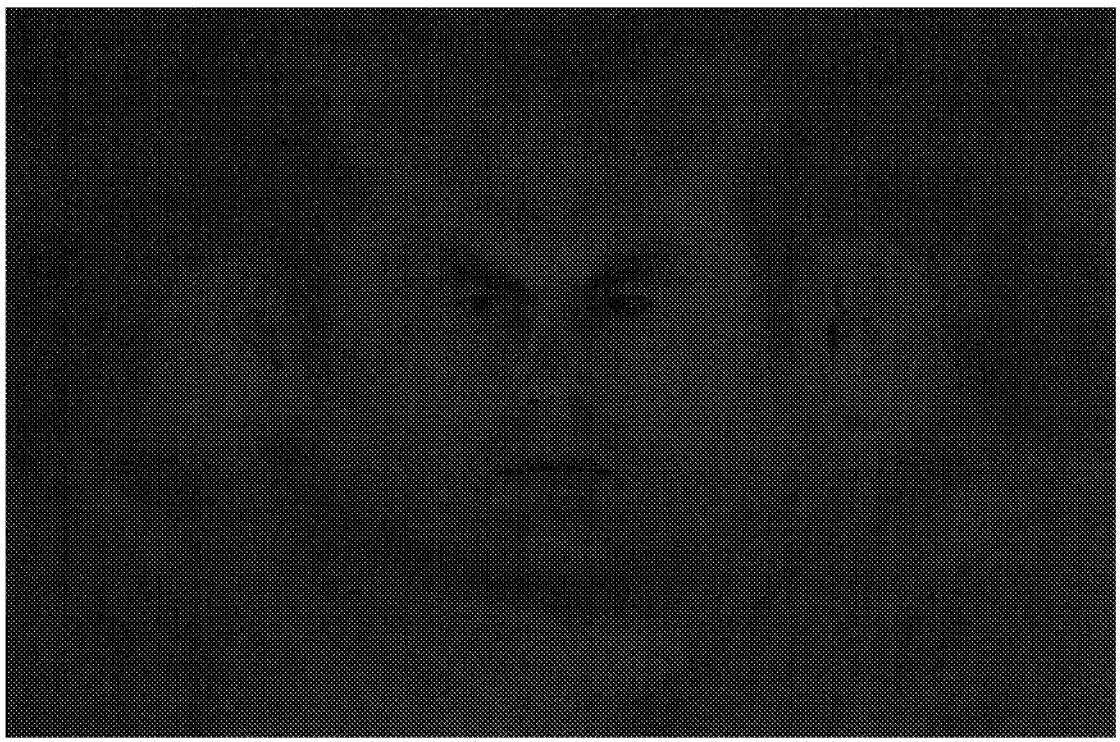
FIG. 6 is a black-and-white photograph showing an exemplary color map for rendering a head using the 3-D model shown in FIG. 2.

Color maps may be separated into separate color channels, as is known to be advantageous for various applications. For example, the color maps may be separated into Red (R), Green (G), or Blue (B) channels for use in a film making application. FIG. 6 shows an exemplary color map 308 for a Red color channel (shown in black-and-white), generated from the 3-D model 302 and skin topography data 304 shown in FIGS. 2 and 3. Similar color maps could be generated for Blue and Green channels. When combined, the three color channels accurately color the 3-D object. Separation into channels may not be desirable for purely computer-graphic applications, such as video games. For such applications, the color map may comprise full-spectrum (RGB) texel values.

A two-dimensional light map for each frame, or for selected key frames, is generated as indicated at step 154. A light intensity matrix or "light map" is similar to a color map or a bump map in that it is a two dimensional matrix that relates to the surface of a three-dimensional object. Each entry of the matrix has a one-to-one relationship with a corresponding point or surface element of the three-dimensional surface. Any suitable method such as known in the art for texture mapping may be used to establish this one-to-one correspondence. Unlike a color map, a light map contains a map (or matrix) of light intensity (brightness or luminosity) values representing diffuse reflection from a standard (e.g., Lambertian gray) surface of the modeled object. Each element of the light map is referred to herein as, a "lumel" to indicate that it is conceptually similar to a "texel" as used in texture mapping. That is, each matrix entry of a texture map pertains to color (specular surface reflection) data and is known is the art as a texel; similarly, each matrix entry of a light map pertains to diffuse light reflected from a standard surface, including primarily the light intensity, and is referred to herein as a lumel.

Light maps are related to ray tracing, in that the light intensity values in the light map may be determined by a ray tracing technique. In summary, light rays impinging on each surface element of the model are calculated, and a resulting intensity of reflected light to a selected viewpoint is computed, as in traditional ray tracing. At each point where a light ray impinges on the viewed three-dimensional object, the intensity and color of the outgoing light ray to the selected viewpoint—i.e., the lumel—is stored in a two-dimensional map. The intensity map represents the light intensity and color over the three-dimensional viewed object as by diffuse reflection in the given light environment from an object having a neutral (e.g., standard gray) surface coloration. As known in the art, a standard gray coloring contains equal amounts of Red, Green, and Blue, so the color of the reflected light is not affected by reflection from the gray surface.

A simple reflectance model using diffuse contributions to reflected light may be used for the ray-tracing, so that the resulting light map does not include the effects of subsurface scattering in the object. This greatly simplifies the ray-tracing calculations. The light map should be computed using data from the bump map, so that it accurately reflects the fine detail of surface topography that is captured in the bump map.

Figure 7:
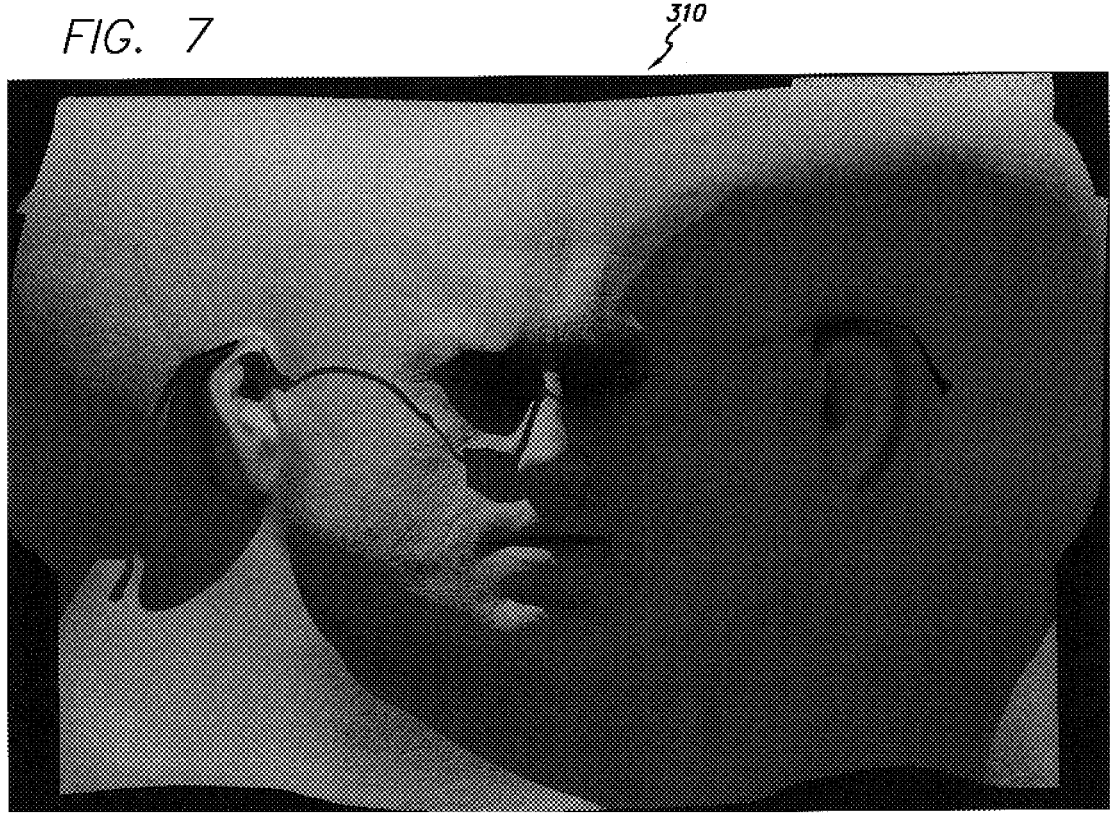
FIG. 7 is a black-and-white photograph showing an exemplary light intensity map for the 3-D model shown in FIG. 2, before blurring.

Subsequent rendering may be simplified if the mapping method used to establish correspondence between the two-dimensional light map and the three-dimensional object is the same as the method used to create the texture map in step 152. Software capable of performing light mapping may be available from mental image GmbH & Co. KG of Berlin, Germany (www.mentalray.com), and in particular, its product called mental ray®. An exemplary light map 310 created with this software using the skin texture data and 3-D model shown in FIGS. 2 and 3 is shown in FIG. 7. Note the sharp relief of the fine surface details, which may lend an unrealistic appearance to rendered result. Despite the use of very accurate, high-resolution skin texture data, the lighting of the skin texture does not appear natural. The effects of subsurface scattering and transmission in skin tissue have not yet been accounted for.

Unlike a bump map or preprocessing-type texture map, a light map represents the intensity of light emanating from an object under particular lighting conditions. Therefore, to accurately render an object under changing lighting conditions, such as when an object moves around a set, it may be desirable to compute a light map for each desired lighting condition and/or location. The computational burden imposed by multiple light maps may be eased somewhat by computing light maps for selected key frames, and interpolating for frames in between.

Each lumel of the light map comprises, at minimum, a scalar value representing a light intensity. Generally, it is also desirable for each lumel to represent the color of diffuse light reflected from a standard gray surface—the color, as it were, of the "incoming" light. In an embodiment of the invention, a light map is combined with the color map computed in step 152. The color map represents the surface coloring of the object. Pixel brightness is determined from the lumels of the light map. Pixel color is determined by combining the color of the "incoming" light from lumels of the light map with the color of the specularly reflected light from the texels of the color map, such as by using a ray-tracing technique. Surprisingly, each pixel has the approximate color and intensity as would be determined using more computationally intensive techniques that model sub-surface scattering and diffusion, and the rendered object is thereby quickly imparted with a realistic appearance. Essentially, the 3-D object may be rendered by reverse-mapping both the light map and color map to the 3-D object geometry, and projecting the result into the viewing plane, using any suitable mapping technique such as mip-mapping.

Light maps and texture maps are sometimes used to render scenes for applications such as video games, where processing speed is more important than strict realism in the rendered result. Unless step 156 of method 150 or an equivalent blurring step is performed, however, such rendering will generally not achieve an optimally realistic result for translucent materials such as skin. Without a blurring step or equivalent operation, an acceptable result for some applications such as video games may be achieved. But even for such applications, a higher degree of realism for certain rendered objects, and in particular, for human or human-like characters, would be desirable. Of course, a higher degree of realism—one that captures the subsurface scattering effect of such materials—is usually desired for many rendering applications, such as motion pictures.

Figure 8A:
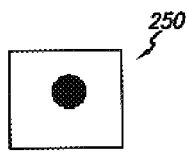
FIG. 8A is a conceptual diagram showing an unblurred light dot.
Figure 8B:
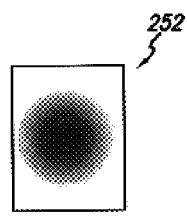
FIG. 8B is a conceptual diagram showing a blurred light dot.

Therefore, referring again to FIG. 5, after a suitable light map has been created, the light map is blurred at step 156. The light map is blurred using any suitable smoothing or blurring algorithm. FIGS. 8A and 8B illustrate the effect of a blurring algorithm, such as a Gaussian blur, on a 2-D circular cluster of lumels having a uniform value. FIGS. 8A and 8B are merely conceptual diagrams for demonstrating an exemplary blurring effect, in a general sense. Dot 250 shown in FIG. 8A illustrates a dot or area of light having a constant intensity value. After the blurring step, each dot or cluster of lumels is transformed into a blurred light dot, such as blurred dot 252 shown in FIG. 8B.

Any suitable blurring algorithm may be used. In the illustrated example, a Gaussian blurring algorithm was used, defined as $e^{-r^2/\sigma}$, where r is the distance from the center of the light dot (equal to $x^2+y^2$ in Cartesian coordinates), and $\sigma$ is a spreading parameter. The algorithm may be roughly calibrated to mimic the effect of the flesh being rendered. Flesh may be calibrated by pointing a collimated light source, such as a laser pointer, at the subject and observing the pattern of the diffuse glow at the skin surface. For example, a laser pointer on human skin will produce a generally circular glow that is about 1 cm in diameter. The diffuse light will be most intense at the center of the glowing area and will drop off rapidly, as a function of the radial distance from its center. A Gaussian blur may be calibrated to achieve this effect. Other blurring functions, particularly those disclosed herein, may be more suitable. The precise blurring effect achieved by the algorithm is not believed to be critical, so long as it generally exhibits properties such as described above.

A convolution may be used to implement a blurring algorithm in an efficient manner, as known in the art. In the alternative, consecutive application of a one-dimensional convolution mask may be used to achieve the same result as a 2-D mask if the blur kernel is circularly symmetric, as known in the art.

To reduce computational time, it may be advantageous to blur the image using a Fast Fourier Transform ("FFT") technique, details of which are well understood in the art. FFT's provide the advantage of being computationally efficient, and may be used to implement a Gaussian blur, as well as any other desired blurring effect. In general, whatever computational technique is used, the computations are inherently two-dimensional. Accordingly, the present method is much less computationally intensive than the three dimensional computations traditionally used for rendering materials that exhibit visible subsurface scattering.

In practice, useful results have been achieved using a blurring algorithm that is virtually as compact and elegant as the conceptual Gaussian blur discussed in connection with FIGS. 8A and 8B. The two-dimensional light map may be separately blurred for Red (R), Green (G) and Blue (B) channels of the image to be rendered. In other words, the calculation is may be performed separately for each RGB color. The initial (unblurred) light map may be the same for all three channels. Three blurred light maps may result from the blurring operations, each of which is specific to a corresponding RGB channel. For purposes of the following equations, each lumel of the light map is identified by a corresponding Cartesian (x,y) coordinate. Each channel is blurred according to the general expression:

$$I_{x,y} = V_{x,y} \cdot I_{0,0}; \quad \text{(Eq. 1)}$$

where $I_{x,y}$ is the R, G, or B the value of the $(x,y)^{th}$ lumel relative to each lumel of the unblurred image, within a blur kernel of predetermined width surrounding each $(x,y)^{th}$ lumel of the image, $V_{x,y}$ is an attenuation factor for the $(x,y)^{th}$ lumel and is the blur "kernel," and $I_{0,0}$ is the R, G, or B intensity for each $(x,y)^{th}$ lumel. The blur may be implemented by convolving each R, G, and B channel using a standard convolution with different kernels for each R, G, and B channels. The kernels $V_{x,y}$ may be generally expressed as:

$$V_{x,y} = 1/(\sqrt{x^2+y^2}+1)^{P_{RGB}} \quad \text{(Eq. 2)}$$

where $P_{RGB}$ is the corresponding $P_R$, $P_G$, or $P_B$ power factor as defined below, and where x and y are computed over the range of $-h_{RGB}$ to $h_{RGB}$, with $h_{RGB}$ being the corresponding $h_R$, $h_G$, or $h_B$ halfwidth of the kernel size for each channel as defined below, in lumels. For each RGB channel, a power factor may be used, as follows:

$$P_R = 2.75 \quad \text{(Eq. 3)}$$

$$P_G = 3.25 \quad \text{(Eq. 4)}$$

$$P_B = 3.50 \quad \text{(Eq. 5)}$$

Optimal values for $P_{RGB}$ may vary depending on the characteristics of the skin to be rendered and the lighting conditions. The exact value of $P_{RGB}$ is not believed to be critical, and the limits of useful ranges for these values may vary. The values above are believed to yield a useful result. The half-width $h_{RGB}$ of the kernel size for each channel is determined by:

$$h_{RGB} = \frac{K_{RGB} \cdot W}{1536} + 0.5 \quad \text{(Eq. 6)}$$

where W is the width or largest dimension of the lightmap, in number of lumels and $K_{RGB}$ is the corresponding kernel size factor $K_R$, $K_G$, and $K_B$ for each channel, as defined below. Again, the exact value of the constants "1536" and "0.5" is not believed to be critical, and the limits of useful ranges for these values may vary. The values above are believed to yield a useful result. The kernel size factor for each RGB channel may be defined as follows:

$$K_R = 15 \quad \text{(Eq. 7)}$$

$$K_G = 11 \quad \text{(Eq. 8)}$$

$$K_B = 10 \quad \text{(Eq. 9)}$$

Figure 9:
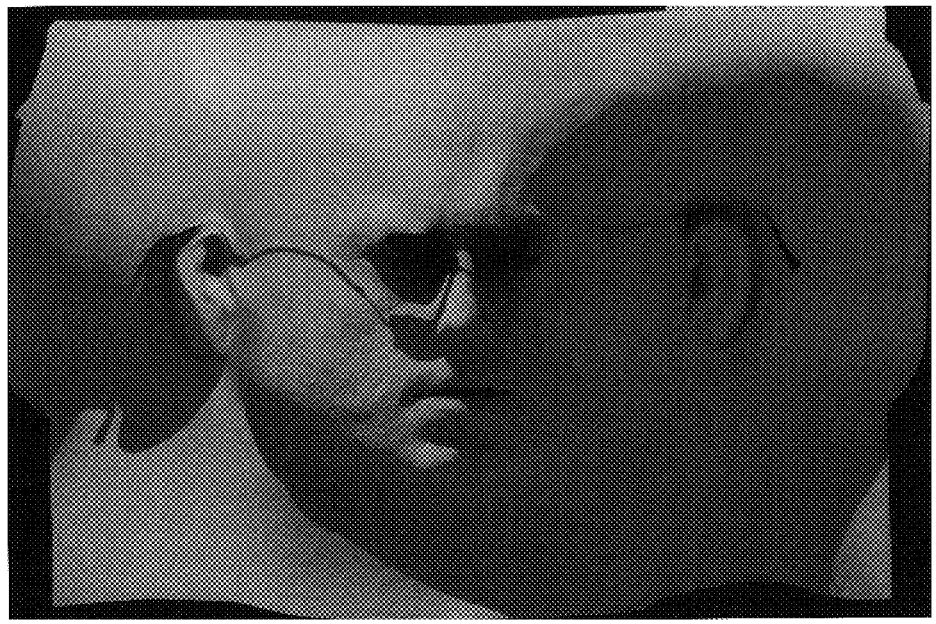
FIG. 9 is a black-and-white photograph showing the light intensity map of FIG. 8, after an exemplary blurring operation.

FIG. 9 shows an exemplary blurred light map 312 after application of a blurring algorithm as described above. If separate RGB color maps are used, a total of three corresponding RGB blurred light maps would be generated using the foregoing algorithm. The fine skin details are still visible in the blurred light map 312, but have a noticeably softer appearance than in the unblurred map 310.

Referring again to FIG. 5, once a suitable light map (or maps) and color map (or maps) have been prepared, the three-dimensional object may be rendered at step 160. Rendering step 160 essentially comprises mapping the light map back onto the three-dimensional object, with colors assigned by the color map. Suitable methods for transforming two-dimensional maps back into a three-dimensional object are well understood in the art. Any suitable method, such as mip-mapping, may be used to render the object from the 2-D maps.

Figure 10:
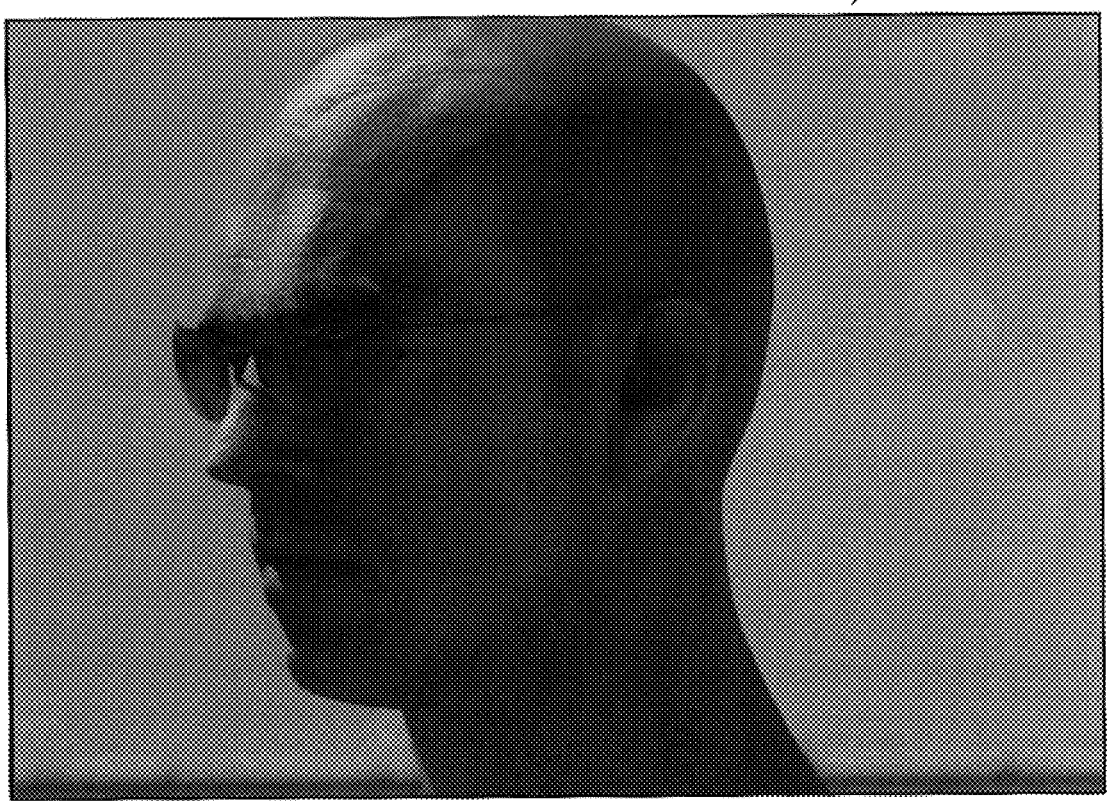
FIG. 10 is a black-and-white photograph showing an exemplary rendered result using the 3-D model, bump map, color map, and blurred light map shown in FIGS. 2, 4, 7, and 9, respectively.

For applications using color-separated RGB light maps, each light map is used with its corresponding R, G, or B color map, such as color map 308 shown in FIG. 6, to produce a color-separated rendering of the digital object. The color-separated renderings may be combined as known in the art to produce a final result. FIG. 10 shows an exemplary final rendered view 314 (in black-and-white) of the rendered object 302. Of course, the actual final rendered view would appear in full color. Despite the obviously intense light source to the subject's upper right (upper left from the viewer's perspective), the rendered object 304 is virtually indistinguishable from a photograph of an actual person.

In view of the computational simplicity required to implement methods 100 and 150, this high degree of realism is truly remarkable. To practice methods 100 and 150, relatively little additional computation is required beyond that customarily used in digital rendering. Despite the computational simplicity of these methods, the effects produced can be startlingly realistic. It is believed that the methods are computationally simple enough to be implemented in applications such as video gaming.

Different viewpoints of object 302 in the same light environment may be generated from the same light map and color map as used to generate view 314. This aspect of the invention may be especially useful for applications such as interactive games, permitting a user to "fly" around a rendered subject by the computationally simple expedient of projecting different views of the same object, without losing any degree of realism.

Optionally, either before or after blurring the light map, and before rendering the digital object, adjustments may be made to the light map to account for special skin areas. For example, some types of tissue such as human ears or webbed areas of duck feet and the like, are quite thin and are capable of transmitting light when the subject is back lit, and/or may exhibit a noticeably higher degree of subsurface scattering. Conversely, other areas, such as calloused areas of palms or soles of the feet, may exhibit relatively little subsurface scattering. Therefore, referring again to FIG. 5, at step 158, the light map may optionally be corrected to account for such effects as thin skin or thick calloused skin. Areas of the skin that exhibit a lesser or greater degree of translucency may be identified on the light map. When the light map is blurred at step 156, the blurring algorithm may be selected based on an assigned translucency value. For example, if a skin area is assigned a relatively high translucency value, it may be more highly blurred, such as by using a Gaussian blue with a higher σ value. Conversely, less translucent areas may be blurred less. Areas that are not translucent, such as areas covered by clothing, may of course remain unblurred.

One of ordinary skill may devise various systems for carrying out the steps of the invention, from complex, multi-processor networked systems for demanding, high-volume applications such as production of feature motion pictures, to simple single-processor, stand-alone systems for portable applications such as video games. Systems as diverse as these may benefit from the realistic results and computational savings that the invention affords. Essentially, a system for performing a method according to the invention may comprise a memory holding a light intensity matrix that is blurred according to the invention to simulate sub-surface scattering effects, and a processor operatively coupled to the memory, programmed to render digital objects using the corresponding blurred light map or maps in the system memory.

Within this essential framework, a great many variations are possible. For example, a number of light intensity maps may be blurred and stored in the system memory in advance, and used as needed for rendering, depending on system inputs. In the alternative, light intensity maps may be calculated and blurred "on the fly" in response to user inputs. Similarly, other steps described above, such as creating and color maps, bump maps, and modeled light environments, and rendering 3D digital objects using these tools, may be implemented along with the use of blurred light intensity maps in systems of various complexity by one of ordinary skill in the art.

Having thus described preferred embodiments of methods for digital representation of skin tissue, it should be apparent to those skilled in the art that certain advantages of the within system have been achieved. It should also be appreciated that various modifications, adaptations, and alternative embodiments thereof may be made within the scope and spirit of the present invention, as discussed above. For example, while a particular blurring algorithm has been disclosed, it should be apparent that the invention is not limited thereby. One of ordinary skill may modify this algorithm, use a different algorithm, or may otherwise perform a step equivalent to the step of blurring a light map to simulate subsurface scattering effects, without departing from the scope of the invention. The invention is defined by the appended claims.

What is claimed is:

1. A method for rendering a digital object, the method comprising:
   receiving information defining a digital object, wherein the digital object comprises a computer-generated three-dimensional surface geometry to be rendered to produce an appearance of translucent skin material, and wherein the information is sufficient for defining modeled light reflected from the surface geometry of the digital object in a modeled light environment;
   generating, using a simple reflectance model, a two-dimensional light intensity matrix representing diffuse reflection from a modeled color-neutral surface of the digital object in the modeled light environment exclusive of sub-surface scattering effects, each matrix entry being a lumel representing a modeled light intensity correlated to a mapped unique surface element of the digital object, using a processor;
   blurring the light intensity matrix, thereby producing a blurred matrix; and
   rendering the digital object, using matrix entries from the blurred matrix to determine pixel intensity values for the digital object combined with a color map representing specular surface reflection from a modeled non-neutral surface of the digital object in the modeled light environment, to produce an appearance simulating subsurface scattering in the translucent skin material.

2. The method of claim 1, wherein the generating step further comprises computing a modeled light intensity for each matrix entry using detailed skin topographical data.

3. The method of claim 2, wherein the generating step further comprises processing the detailed skin topographical data in the form of a bump map.

4. The method of claim 2, further comprising obtaining the detailed skin topographical data by measuring a three-dimensional structure of a skin surface sample.

5. The method of claim 1, wherein the rendering step further comprises using color values from a color map to determine pixel color values for the digital object.

6. The method of claim 1, wherein the rendering step further comprises determining the pixel intensity values by mip-mapping the blurred light intensity matrix.

7. The method of claim 6, further comprising generating a color map comprising a two-dimensional matrix, wherein each matrix entry of the color map represents a color of the unique surface element of the digital object.

8. The method of claim 1, wherein the blurring step further comprises convolving the light intensity matrix.

9. The method of claim 1, wherein the blurring step further comprises processing the light intensity matrix using a Fast Fourier Transform function.

10. The method of claim 1, wherein the blurring step further comprises executing a blurring algorithm of the form $e^{-(x^2+y^2)/\sigma}$, where x and y are the horizontal and vertical widths, respectively, of the blur kernel in number of lumels, e is the base of the natural logarithm, and $\sigma$ is a spreading parameter.

11. The method of claim 1, wherein the generating step further comprises generating a light intensity matrix for each of three color separation channels.

12. The method of claim 11, wherein the blurring step further comprises blurring the light intensity map for each channel according to the general expression $$I_{x,y} = V_{x,y} \cdot I_{0,0};$$

where $I_{x,y}$ is a blurred value of each $(x,y)_{th}$ lumel, $V_{x,y}$ is an attenuation factor for each $(x,y)_{th}$ lumel defining a blur kernel having a predetermined width, and $I_{0,0}$ is an unblurred value of each $(x,y)_{th}$ lumel of the light intensity map.

13. The method of claim 12, wherein the blurring step further comprises computing the blur kernel $$V_{x,y} = 1/(\sqrt{x^2+y^2}+1)^{P_{RGB}}$$

separately for each channel, wherein x and y are computed over the range of $-h_{RGB}$ to $h_{RGB}$, $h_{RGB}$ is a corresponding $h_R$, $h_G$, or $h_B$ halfwidth of the blur kernel for each channel, and $P_{RGB}$ is a corresponding $P_R$, $P_G$, or $P_B$ power factor for each channel.

14. The method of claim 12, wherein the blurring step further comprises computing $V_{x,y}$ using a corresponding value of $P_R$, $P_G$, and $P_B$ for each respective color channel within a range of 2 to 4.

15. The method of claim 12, wherein the blurring step further comprises computing $V_{x,y}$ over a halfwidth $h_{RGB}$ determined by $$h_{RGB} = \frac{K_{RGB} \cdot W}{a} + b$$

where W is the width or largest dimension of the lightmap, in number of lumels, $K_{RGB}$ is a corresponding kernel size factor $K_R$, $K_G$, and $K_B$ for each respective color channel within a range of 5 to 20, a is within a range of 1000 to 2000, and b is within a range of 0 to 1.

16. A system for rendering a digital object, the system comprising a memory holding a two-dimensional light intensity matrix representing diffuse reflection from a modeled color-neutral surface of the digital object in a modeled light environment without subsurface scattering effects, each matrix entry being a lumel representing a modeled light intensity correlated to a mapped unique surface element of the digital object, wherein the light intensity matrix is a blurred matrix; and
   a processor operatively coupled to the memory, whereby the processor determines pixel intensity values for rendering the digital object using matrix entries from the blurred matrix combined with a color map representing specular surface reflection from a modeled color non-neutral surface of the digital object, to provide a rendered appearance of the digital object emulating subsurface scattering in a translucent skin material.

17. The system of claim 16, wherein the processor determines values of each matrix entry of the blurred matrix using an unblurred light intensity matrix and a blurring algorithm.

18. The system of claim 16, wherein the memory further holds a two-dimensional color map of the digital object, and wherein the processor determines pixel color values for rendering the digital object using the color map.

19. The system of claim 16, wherein the memory further holds a two-dimensional bump map, the bump map describing fine surface variation between surfaces of the digital object and a modeled 3D geometry of the digital object.

20. The system of claim 19, wherein the processor calculates a two-dimensional unblurred light intensity matrix using the bump map and a modeled light environment.

* * * * *